United States Patent [19]

Goshima et al.

[11] 4,318,583
[45] Mar. 9, 1982

[54] OPTICAL SCANNING SYSTEM WITH ANAMORPHIC OPTICAL SYSTEM

[75] Inventors: Takeshi Goshima, Tokyo; Kazuo Minoura, Yokohama, both of Japan

[73] Assignee: Canon Kabushiki Kaisha, Tokyo, Japan

[21] Appl. No.: 126,347

[22] Filed: Mar. 3, 1980

Related U.S. Application Data

[63] Continuation of Ser. No. 929,241, Jul. 31, 1978, abandoned.

[30] Foreign Application Priority Data

Aug. 5, 1977 [JP] Japan ............... 52-93996
Jul. 18, 1978 [JP] Japan ............... 53-87329

[51] Int. Cl.³ .............................................. G02B 27/17
[52] U.S. Cl. .................................. 350/6.6; 350/6.8
[58] Field of Search ................ 350/6.1, 6.5–6.91, 350/420, 433, 479, 481

[56] References Cited

U.S. PATENT DOCUMENTS

| | | | |
|---|---|---|---|
| 2,692,369 | 10/1954 | Geiser | 350/6.6 |
| 3,345,120 | 10/1967 | Palmer | 350/6.7 |
| 3,573,849 | 4/1971 | Herriott et al. | 250/237 G |
| 3,668,984 | 6/1972 | Rosin | 350/6.5 |
| 3,687,025 | 8/1972 | Rosin | 350/6.91 |
| 3,750,189 | 7/1973 | Fleischer | 350/6.91 |
| 3,865,465 | 2/1975 | Tatuora et al. | 350/6.8 |
| 3,877,777 | 4/1975 | Glenn | 350/6.7 |
| 3,946,150 | 3/1976 | Grafton | 358/285 |
| 3,961,838 | 6/1976 | Zanoni | 350/481 |
| 3,973,833 | 8/1976 | Lawson | 350/481 |
| 4,056,307 | 11/1977 | Rayces | 350/420 |
| 4,108,532 | 8/1978 | Minoura | 350/6.6 |
| 4,121,883 | 10/1978 | Goshima et al. | 350/6.8 |
| 4,122,462 | 10/1978 | Hirayama et al. | 358/285 |
| 4,179,183 | 12/1979 | Tateoka et al. | 350/6.1 |
| 4,180,307 | 12/1979 | Tateoka et al. | 350/6.5 |

*Primary Examiner*—Jon W. Henry
*Attorney, Agent, or Firm*—Fitzpatrick, Cella, Harper & Scinto

[57] ABSTRACT

An optical scanning system is disclosed in which only an anamorphic optical system is disposed between a deflector and a scanned surface. The anamorphic optical system comprises a first anamorphic optical system which focuses light in the direction of the scanning line and a second anamorphic optical system which focuses light in a plane normal to the scanning line. The first anamorphic optical system is composed of one or two cylindrical lenses and has an optical means for moving the beam on the scanned surface at uniform speed. The second anamorphic optical system functions to correct a positional error of the scanning beam on the scanned surface caused by the inclination of the deflector from its normal position.

3 Claims, 10 Drawing Figures

OPTICAL SCANNING SYSTEM WITH ANAMORPHIC OPTICAL SYSTEM

This is a continuation of application Ser. No. 929,241, filed July 31, 1978, now abandoned.

BACKGROUND OF THE INVENTION a. Field of the Invention

The present invention relates to an optical scanning system and more particularly relates to an optical scanning system including an optical system for correcting the error caused by inclination of a deflecting device from its normal position.

b. Description of the Prior Art

In a scanning system using deflecting mirror surfaces rotating about an axis such as a polygon mirror or galvano mirror, there may occur such unfavourable phenomenon that the deflecting mirror surface tilts in the direction normal to the deflection surface in such manner as to produce an error of the position of the deflection. Such error is known as tilt error. If such an error in position occurs, then the deflection scanning will be deviated in the direction normal to the deflection surface so that the uniformity in pitch of the scanning lines may be disturbed. Therefore, this phenomenon should be corrected and an optical system used for this purpose of correction is called a tilt error correcting optical system. Herein, the term "deflection surface" means a surface which a normal line to the deflecting mirror surface describes with time as the deflecting mirror surface rotates.

Various optical scanning systems provided with a tilt error correcting optical system have been proposed and are known in the art. In view of the optical relation between the deflecting mirror surface and the scanned surface, these known optical scanning systems are divided into two groups, the conjugate type and the non-conjugate type.

It is also an important problem for the optical scanning optical system to keep constant the moving speed of the deflected beam spot on the scanned surface. Generally, the scanning speed of the beam spot is determined by the characteristics of the rotational movement of the deflecting device used as well as by the distortion characteristics of the lens used for scanning.

The above mentioned conjugate type of optical scanning system is featured by the fact that the deflecting mirror surface and the scanned surface are in a conjugated relation relative to the optical system interposed therebetween in a plane normal to the above defined deflection surface to correct any tilt error. Typical examples of this type of optical scanning system are disclosed in U.S. Pat. Nos. 3,750,189, 3,865,465 and 3,946,150.

However, in U.S. Pat. Nos. 3,750,189 and 3,865,465 there is no description of a technique for moving the beam spot at uniform speed on the scanned surface. In U.S. Pat. No. 3,946,150, there is a description of a technique for moving the beam spot at uniform speed. According to the teaching, uniform speed of scanning beam spot and correction of tilt error are attained by using an anamorphic lens system and a spherical scanning lens. However, such a combination of an anamorphic optical system and a spherical optical system is very difficult to design because the combination must be disposed between the deflecting device and the scanned surface so as to satisfy both of the uniformity of beam spot moving speed and the necessary correction of tilt error.

The non-conjugate type of optical scanning system is featured by the fact that the deflecting mirror surface and the scanned surface are in a non-conjugated relation with respect to the optical system disposed therebetween in a plane normal to the deflection surface. The optical system is so designed, to correct tilt error, that its focal length measured along the deflection surface becomes longer than that measured along a plane normal to the deflection surface. Typical examples of this type of optical scanning system are disclosed in U.S. Pat. No. 3,877,777, DAS. No. 2,517,821 and U.S. Pat. No. 4,056,307. Among these publications, U.S. Pat. No. 3,877,777 contains no teaching of means for attaining the uniformity of beam spot moving speed on the scanned surface. DAS. No. 2,517,821 contains some teaching about it according to which an anamorphic optical system and a spherical scanning lens are disposed between the deflecting device and the scanned surface. The last mentioned U.S. Pat. No. 4,056,307 proposed to dispose only an anamorphic optical system between the deflecting device and the scanned surface in order to satisfy the requirements of tilt error correction and uniform speed of moving beam spot. However, this arrangement requires six cylindrical lenses to attain the necessary uniformity of beam spot moving speed and therefore the lens system for scanning takes an extremely large space. No compact structure is obtainable according to this prior art.

SUMMARY OF THE INVENTION

Accordingly, it is an object of the present invention to provide an improved optical scanning system which can satisfy the requirements of tilt error correction and uniform speed of beam spot at the same time and more effectively than the above mentioned prior art ones.

It is another object of the invention to provide such optical scanning optical system which allows a simple and compact arrangement of lenses and can satisfy the requirements of tilt error correction and uniform speed of beam spot at the same time.

It is a further object of the invention to provide an optical scanning system the scanning lens system of which is very easy to design and convenient to dispose between the deflecting device and the scanned surface.

The optical scanning system according to the invention may be designed as either the conjugate type or as the non-conjugate type.

In designing the conjugate type of optical scanning system according to the invention, technical matter contributive to tilt error correction is taken into a plane and technical matter contributive to the uniformity of speed of beam spot is taken into another plane orthogonal to the first one. More concretely, according to the invention, between the deflecting device and the scanned surface there are disposed a first unidimensional focussing optical system the light focussing action of which is effective only within the above defined deflection surface and a second unidimensional focussing optical system the light focussing action of which is effective only in the direction normal to the deflection surface. The first unidimensional focussing optical system has means for moving the beam spot on the scanned surface at uniform speed whereas the second one has means for effecting correction of tilt error. Since each of the two unidimensional focussing optical systems is able to have power only in its own direction across the other direction, the two optical systems can be operated independently of each other. Thus, when the first one is operated to attain the uniformity of speed, it has no effect on the performance of the second one regarding correction of tilt error. Similarly, the function of the first one is never affected by operating the second one to correct a tilt error. Therefore, it is allowed to design the first and second unidimensional focussing optical systems without worrying about them interfering with each other. Refractive power and position of the first one may be selected independently of those of the second one. A larger degree of freedom in design is therefore obtained.

According to one aspect of the invention, the above described first unidimensional focussing optical system is composed of one or two cylindrical lenses, which permits a particularly compact structure of the whole system.

In designing a non-conjugate type of optical scanning system according to the invention, a first focussing optical system the focussing action of which is effective only in the deflection surface and a second focussing optical system the focussing action of which is effective only in a plane normal to the deflection surface are disposed between the deflecting device and the scanned surface. The first optical system is composed of one or two cylindrical lenses and is provided with means for moving the beam spot on the scanned surface at uniform speed. The second optical system is designed in such manner that its focal line lies in the scanned surface.

According to another aspect of the invention, the second focussing optical system used in the above described non-conjugate type of optical scanning system is composed of a plural number of cylindrical lenses arranged in a fashion of retro-focus type of lens so as to shorten the focal length and lengthen the back focus. With this arrangement, there is obtained a further improved effect of tilt error correction.

Other and further objects, features and advantages of the invention will appear more fully from the following description taken in connection with the accompanying drawings.

DESCRIPTION OF THE PREFERRED EMBODIMENTS

Figure 1:
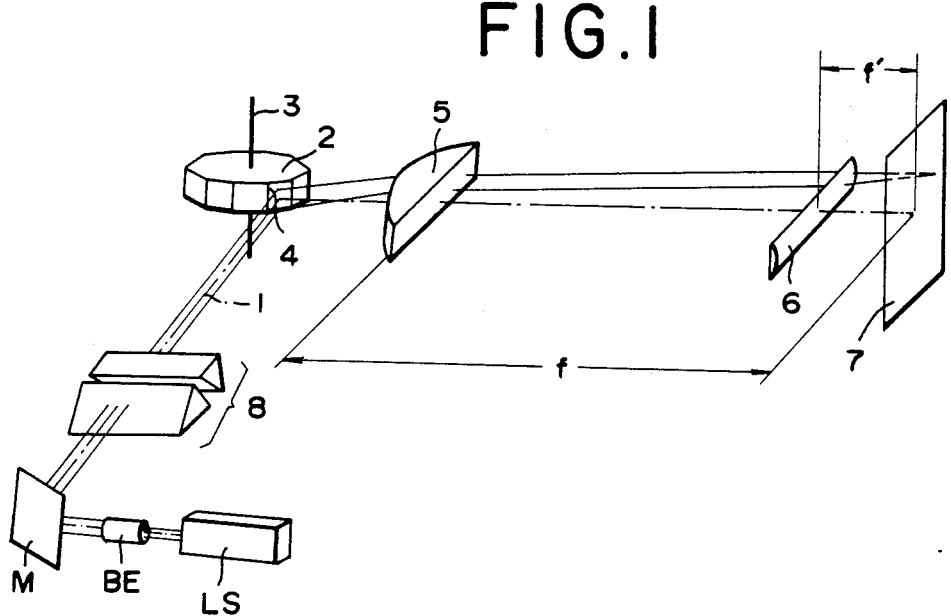
FIG. 1 schematically shows an embodiment of optical scanning system according to the invention.

Referring first to FIG. 1 there is shown an embodiment of an optical scanning system designed as a non-conjugate type system according to the invention. A beam emitted from a laser light source LS is expanded in its beam diameter by a beam expander BE and then deflected by a stationary mirror M. The collimated (parallel) beam coming from the above light source apparatus LS, BE, M is designated by 1. Designated by 2 is a polygon mirror which is driven in rotation by a driving apparatus not shown. The beam 1 incident upon the deflecting mirror surface 4 is deflected along the deflection surface as the polygon mirror 2 rotates about its rotation axis 3. Designated by 5 is a cylindrical lens system which has a focussing action with respect to the deflection surface and is composed of one or two cylindrical lenses. 6 is a cylindrical lens system which has a focussing action with respect to a surface normal to the deflection surface. A scanned surface 7 lies in the focal planes of the two cylindrical lens systems 5 and 6. The focal length f of cylindrical lens system 5 is larger than the focal length f' of cylindrical lens system 6. Namely, $f > f'$. This arrangement moderates the tilting phenomenon of the deflecting mirror surface as shown in FIG. 2.

Figure 2:
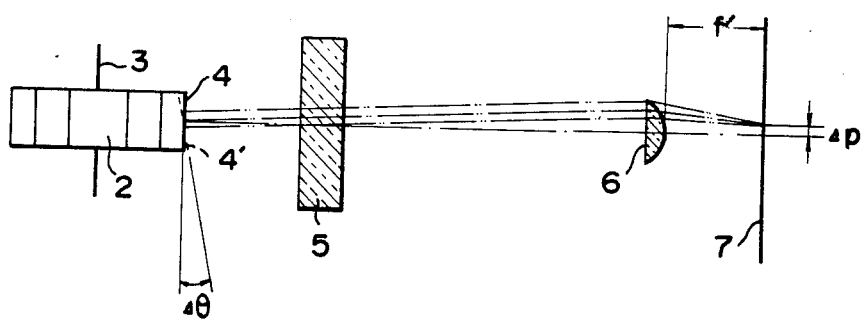
FIG. 2 shows the principle of tilt error correction in a non-conjugate type of optical scanning system according to the invention.

In FIG. 2 which shows the optical arrangement along the optical axis of the embodiment of FIG. 1, the reference numeral 4' designates a deflecting mirror surface inclined with $\Delta\theta$ relative to a plane normal to the deflection surface as a result of error during the manufacture thereof. This tilt error causes in turn the scanning line to deviate by $\Delta p$ on the scanned surface 7. When $\Delta\theta$ is small, $\Delta p$ is represented by: $\Delta p = 2f' \cdot \Delta\theta$. This $\Delta p$ can be made smaller by shortening the focal length f' of the cylindrical lens system 6. On the other hand, it is desirable to lengthen the focal length f of the cylindrical lens system 5 as much as possible. Since the cylindrical lens system 5 concerns the scanning direction, the larger the deviation $\Delta p$ is, the larger scanning width can be obtained.

In this manner, the inclination of the deflecting mirror surface (tilt error) can be compensated with the arrangement shown in FIG. 2. The use of two orthogonal cylindrical lens systems 5 and 6 makes it possible to select the focal lengths f and f' independently of each other.

While in the above described embodiment the scanned surface 7 is shown to lie in the focal plane of the cylindrical lens systems 5 and 6, the position of the scanned surface 7 may be displaced from the shown position within the depth of focus of these lenses. When the scanned surface is moved, the aspect ratio of spot diameter on the scanned surface is somewhat changed. Making use of this, the shape of spot may be controlled by moving the scanned surface. In FIG. 1, the reference numeral 8 designates an anamorphic afocal beam expander. The collimated beam 1 incident upon the rotating polygon mirror 2 is subjected to the action of the beam expander 8 so that the cross-sectional shape of the beam 1 is changed to produce a desired shape on the scanned surface.

Figure 3:
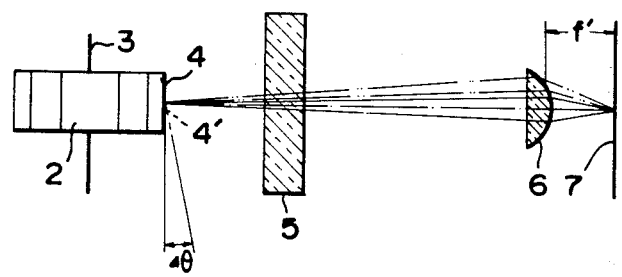
FIG. 3 shows the principle of tilt error correction in a conjugate type of optical scanning system according to the invention.

A conjugate type of optical scanning system according to the invention is shown in FIG. 3. In case of this type of system, the deflection mirror surface 4 of the rotating polygon mirror 2 and the scanned surface 7 are in optically conjugated relation with respect to the cylindrical lens system 6. The beam incident upon the rotating polygon mirror 2 is focussed upon the deflecting mirror surface 4 as far as the component of the incident beam in the direction normal to the deflection surface is concerned. Therefore, the beam of light forms a line image on the deflecting mirror surface 4. Even when the beam of light is deflected by the above described deflecting mirror surface 4' erroneously inclined, the beam can always be focussed at the same point on the scanned surface 7 (see, dotted line on FIG. 3).

The cylindrial lens system 5 has two functions. One is to focus on the scanned surface 7 the component of the beam of light deflected by the deflector 2 and existing in the deflection surface. Another is to move the beam spot on the scanned surface 7 at a uniform speed as the polygon mirror 2 rotates. A particular advantage of the invention is that the cylindrical lens system can be composed of a reduced number of lenses and therefore the size of the apparatus can be reduced as a whole. According to the invention, the cylindrical lens system 5 can be formed successfully using only one or two cylindrical lenses.

Now, the cylindrical lens system having a focussing action in the deflection surface will be described in detail.

As a first example, description is made of the case wherein the cylindrical lens system 5 is composed of two cylindrical lenses. When F number is of dark side, the correction of aberrations of the cylindrical lens system 5 is carried out as follows:

When F number is of dark side, spherical aberration and coma have not to be considered so much and primarily Petzval sum P, astigmatism III and distortion V need correction. As for Petzval sum P, the first cylindrical lens 5a and the second cylindrical lens 5b of the cylindrical lens system 5 shown in FIG. 4 should be selected at first to satisfy the following relation:

$$P = \frac{\phi_1}{N_1} + \frac{\phi_2}{N_2} \simeq 0 \qquad (1)$$

wherein,
$\phi_1$ is refractive power of the first lens 5a
$N_1$ is refractive index of the first lens 5a
$\phi_2$ is refractive power of the second lens 5b and
$N_2$ is refractive index of the second lens 5b.

Then, the configuration of thin lens can be determined using the following relation formula as described in "Methods for Lens Design" written by Matui, published by Kyoritu Publishing Co., Ltd., Tokyo, Japan:

$$\begin{cases} III = \sum_{i=1}^{2} (a_{IIIi} \cdot A_{oi} + b_{IIIi} \cdot B_{oi} + C_{IIIi}) \\ V = \sum_{i=1}^{2} (a_{vi} \cdot A_{oi} + b_{vi} \cdot B_{oi} + C_{vi}) \end{cases} \qquad (2)$$

wherein, $a_{IIIi}$, $b_{IIIi}$, $C_{IIIi}$, $a_{vi}$, $b_{vi}$ and $C_{vi}$ are characterization factors of the i-th lens, that is, constants determined by the paraxial relation and medium in front and behind the thin lens system, and $A_{oi}$ and $B_{oi}$ are specific factors of the i-th lens.

Between the specific factors $A_{oi}$ and $B_{oi}$ of a single lens, there is a dependent relation so that when one of them is determined, the other is automatically given. Therefore, when aimed correction values are set for astigmatism III and distortion V in the above formula (2) respectively, then the formula (2) will give simultaneous equations wherein among $A_{o1}$, $B_{o1}$, $A_{o2}$ and $B_{o2}$ only two are unknown. By solving the simultaneous equations, the unknown values are determined and the configuration of each lens can be determined thereby.

In connection with the above, it should be noted that the position of the object point is related with the above mentioned the characterization factors so that the values of characterization factors change with the change of the position of the object point. Therefore, the configuration of each lens obtained by solving the above simultaneous equations also changes accordingly.

Figure 4:
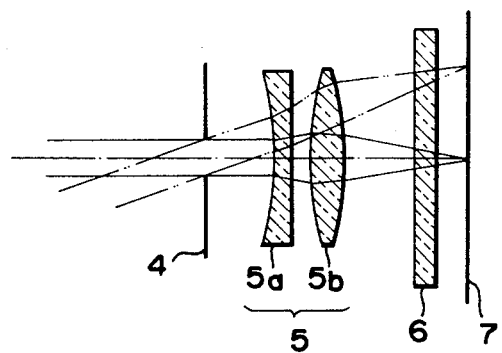
FIG. 4 shows an arrangement of optical scanning system designed to attain the aimed uniformity of beam spot moving speed according to the invention using two cylindrical lenses in the optical scanning system.

The cylindrical lens system 5 shown in FIG. 4 is a system in which the position of the object point is at infinity, that is, the incident beams are parallel beams. Now, description will be made of this cylindrical lens system 5.

In the case where the incident beam for deflection in the deflection plane is a parallel beam as in the case of FIG. 4, the moving speed of the beam spot on the scanned surface 7 can be made constant in the following manner:

(i) When a deflecting device is used which has the characteristic of rotational motion for uniform angular velocity deflection (for example, rotating polygon mirror), the value of distortion V should be determined to be:

$$V = \tfrac{2}{3}$$

(ii) When the characteristics of rotational motion of the deflecting device then used is that for sinusoidal oscillation deflection (for example, galvano mirror) represented by $$\phi = \phi_0 \sin Kt$$

wherein,
$\phi$: angle of rotation,
k: constant,
$\phi_0$: amplitude, and
t: time,
then, the value of distortion V should be determined to be:

$$V = \tfrac{2}{3}\left(1 - \tfrac{1}{2}\left(\frac{1}{2\phi_0}\right)^2\right)$$

By setting the above values for distortion V in the deflection surface of the cylindrical lens system 5, the uniformity of speed of the beam spot moving on the scanned surface 7 can be attained.

When the cylindrical lens system 5 is composed of two cylindrical lenses and $V = \tfrac{2}{3}$ as described above, a good effect on the uniformity of speed can be obtained by the cylindrical lens system 5 composed of a cylindrical lens 5a which is disposed on the side of the deflecting device and having a negative refractive power in the deflection surface and a cylindrical lens 5b which has a positive refractive power in the deflection surface. In addition, provided that the focal length of the cylindrical lens system 5 is 1 in the deflection surface, $1.46 \leq N_1 \leq 1.84$ and $1.46 \leq N_2 \leq 1.84$ wherein $N_1$ is refractive index of the cylindrical lens 5a and N₂ is refractive index of the cylindrical lens 5b, the cylindrical lens system 5 has to satisfy the following conditions:

$-6 \leq \phi_1 \leq -0.4$
$0.015 \leq e' \leq 0.2$
$-11.4634 \leq B_{01} \leq 0.8648$ or $-4 \leq \phi_1 \leq -0.4$
$0.025 \leq e' \leq 0.1$
$5.7779 \leq B_{01} \leq 18.178$ wherein, $\phi_1$: power of the first part system when the focal length of the lens system is 1, $e'$: distance between the principal points of the first part system and the second part system when the focal length of the lens system is 1, and $B_{01}$: specific factor of the first part system.

Examples of compositions of the above described cylindrical lens system are given below, in which $r_1$ is radius of curvature of the cylindrical lens 5a on the side of the deflector, $r_2$ is radius of curvature of the cylindrical lens 5a on the side of the scanned surface, $r_3$ is radius of curvature of the cylindrical lens 5b on the side of the deflector, $r_4$ is radius of curvature of the cylindrical lens 5b on the side of the scanned surface, $n_1$ is refractive index of the cylindrical lens 5a, $n_2$ is refractive index of the cylindrical lens 5b, $d_o$ is air-gap on axis between the deflecting surface 4 and the cylindrical lens 5a, $d_1$ is thickness on axis of the cylindrical lens 5a, $d_2$ is air-gap on axis between the cylindrical lenses 5a and 5b, $d_3$ is thickness on axis of the cylindrical lens 5b, f is focal length, Fno is F number, W is angle of field, I is spherical aberration, II is coma, III is astigmatism, P is Petzval sum and V is distortion.

All the values of $\phi_1$, $e'$ and $B_{01}$ given in Examples are values obtained when normalized to f=1.

Figure 7:
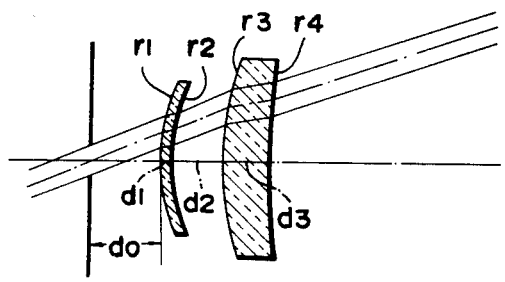
FIGS. 7 and 8 show additional embodiments of cylindrical lens systems used in the optical scanning system according to the invention.

Lens configuration of Example 1 is shown in FIG. 7.

EXAMPLE 1 f = 300 , Fno = 1:60 , W/2 = 20.9°,
Wavelength used λ = 0.6328μ
$r_1 = 30.489$     $d_0 = 12.864$
$r_2 = 22.977$     $d_1 = 0.831$     $n_1 = 1.65$
$r_3 = 47.964$     $d_2 = 8.524$
$r_4 = 156.223$    $d_3 = 9.297$     $n_2 = 1.65$
Aberration factors when normalized to f = 1
I = −513.851 , II = −34.8015 , III = 0.1722
P = 0.4402 , V = 0.4622
$\phi_1 = -2$, $e' = 0.015$, $B_{01} = -10.4399$

EXAMPLE 2 f = 300 , Fno = 1:60 , W/2 = 20.8°,
Wavelength used λ = 0.6328μ
$r_1 = -204.873$   $d_0 = 13.571$
$r_2 = 39.111$     $d_1 = 2.82$      $n_1 = 1.65$
$r_3 = 53.927$     $d_2 = 3.088$
$r_4 = -68.043$    $d_3 = 4.195$     $n_2 = 1.65$
Aberration factors when normalized to f = 1
I = −207.3374 , II = −26.6899 , III = −0.6937
P = 0.3294 , V = 0.4084
$\phi_1 = -5.956$ , $e' = 0.015$ , $B_{01} = -2.1442$

EXAMPLE 3 f = 300 , FNO = 1:60 , W/2 = 17.03°,
Wavelength used λ = 0.6328μ
$r_1 = -447.184$   $d_0 = 72.249$
$r_2 = 70.88$      $d_1 = 5.279$     $n_1 = 1.65$
$r_3 = 72.372$     $d_2 = 0.388$
$r_4 = -134.899$   $d_3 = 16.816$    $n_2 = 1.65$
Aberration factors when normalized to f = 1
I = 9.4746 , II = −1.0533 , III = −0.3633
P = 0.5774 , V = 0.4031 ,
$\phi_1 = -3.2$ , $e' = 0.015$ , $B_{01} = -2.2018$

EXAMPLE 4 f = 300 , FNO = 1:60 , W/2 = 21.05°,
Wavelength used λ = 0.6328μ
$r_1 = 1187.6279$  $d_0 = 113.9414$
$r_2 = 344.8159$   $d_1 = 7.0708$    $n_1 = 1.65$
$r_3 = 387.8132$   $d_2 = 2.0085$
$r_4 = -216.9692$  $d_3 = 10.8597$   $n_2 = 1.65$
Aberration factors when normalized to f = 1
I = 5.3087 , II = −0.0922 , III = −0.0171
P = 0.6062 , V = 0.6808 ,
$\phi_1 = -0.4$ , $e' = 0.015$ , $B_{01} = -3.5527$

EXAMPLE 5 f = 300 , FNO = 1:60 , W/2 = 19.1°,
Wavelength used λ = 0.6328μ
$r_1 = 783.755$    $d_0 = 155.584$
$r_2 = 114.433$    $d_1 = 6.2$       $n_1 = 1.65$
$r_3 = 121.627$    $d_2 = 1.743$
$r_4 = -232.64$    $d_3 = 16.059$    $n_2 = 1.65$
Aberration factors when normalized to f = 1
I = 3.0057 , II = −0.931 , III = −0.3176
P = 0.5977 , V = 0.6243 ,
$\phi_1 = -1.4498$ , $e' = 0.015$ , $B_{01} = -2.9625$

EXAMPLE 6 f = 300 , FNO = 1:60 , W/2 = 28.65°,
Wavelength used λ = 0.6328μ
$r_1 = -104.605$   $d_0 = 37.9472$
$r_2 = 192.2735$   $d_1 = 8.3761$    $n_1 = 1.50839$
$r_3 = 410.9009$   $d_2 = 9.7979$
$r_4 = -105.0861$  $d_3 = 17.3272$   $n_2 = 1.79883$
Aberration factors when normalized to f = 1
I = 19.97 , II = −0.2535 , III = −0.1543
P = 0.0995 , V = 0.5485
$\phi_1 = 2.272$ , $e' = 0.0705$ , $B_{01} = -0.8685$

EXAMPLE 7 f = 300 , FNO = 1:60 , W/2 = 21.04°,
Wavelength used λ = 0.6328μ
$r_1 = 678.3716$   $d_0 = 12.9914$
$r_2 = 283.3384$   $d_1 = 1.9262$    $n_1 = 1.65$
$r_3 = 1218.104$   $d_2 = 56.4336$
$r_4 = -171.164$   $d_{26} = 8.2708$ $n_2 = 1.65$
Aberration factors when normalized to f = 1
I = 8.8501 , II = −1.3169 , III = −0.0041
P = 0.5446 , V = 0.6592

-continued $\phi_1 = -0.4$ , $e' = 0.2$ , $B_{01} = -4.3141$

EXAMPLE 8

$f = 300$ , FNO = 1:60 , $W/2 = 21.12$
Wavelength used $\lambda = 0.6328\mu$
$r_1 = -189.4439$   $d_0 = 15.7232$
$r_2 = -857.7339$   $d_1 = 4.1992$   $n_1 = 1.65$
$r_3 = 1803.8304$   $d_2 = 51.0926$
$r_4 = -134.7829$   $d_3 = 9.9685$   $n_2 = 1.65$
Aberration factors when normalized to $f = 1$
$I = 18.1113$ , $II = 0.7024$ , $III = -0.0174$
$P = 0.4563$ , $V = 0.7119$
$\phi_1 = -0.8$ , $e' = 0.2$ , $B_{01} = 0.6407$

EXAMPLE 9

$f = 300$ , FNO = 1:60 , $W/2 = 20.94°$,
Wavelength used $\lambda = 0.6328\mu$
$r_1 = -564.7932$   $d_0 = 72.4612$
$r_2 = 132.5783$    $d_1 = 5.1875$   $n_1 = 1.65$
$r_3 = 1546.3578$   $d_2 = 38.7119$
$r_4 = -99.4955$    $d_3 = 36.0255$  $n_2 = 1.65$
Aberration factors when normalized to $f = 1$
$I = 34.8618$ , $II = 5.2323$ , $III = 0.1703$
$P = 0.1636$ , $V = 0.5574$
$\phi_1 = -1.8215$ , $e' = 0.2$ , $B_{01} = -1.8215$

EXAMPLE 10

$f = 300$ , FNO = 1:60 , $W/2 = 20.9°$,
Wavelength used $\lambda = 0.6328\mu$
$r_1 = -16184.591$  $d_0 = 116.4$
$r_2 = 166.148$     $d_1 = 6.002$    $n_1 = 1.65$
$r_3 = 687.65$      $d_2 = 39.068$
$r_4 = -128.454$    $d_3 = 40.125$   $n_2 = 1.65$
Aberration factors when normalized to $f = 1$
$I = 16.2736$ , $II = 3.7735$ , $III = 0.3926$
$P = 0.3733$ , $V = 0.6205$
$\phi_1 = -1.186$ , $e' = 0.2$ , $B_{01} = -2.5134$

EXAMPLE 11

$f = 300$ , FNO = 1:60 , $W/2 = 18.92°$,
Wavelength used $\lambda = 0.6328\mu$
$r_1 = -13.29$      $d_0 = 18.508$
$r_2 = -19.315$     $d_1 = 2.24$     $n_1 = 1.65$
$r_3 = -70.307$     $d_2 = 0.171$
$r_4 = -27.263$     $d_3 = 2.3$      $n_2 = 1.65$
Aberration factors when normalized to $f = 1$
$I = -1821.0861$ , $II = -49.8906$ , $III = 0.3634$
$P = -0.1201$ , $V = 0.4741$
$\phi_1 = -3.9036$ , $e' = 0.025$ , $B_{01} = 6.7412$

EXAMPLE 12

$f = 300$ , FNO = 1:60 , $W/2 = 28.65°$,
Wavelength used $\lambda = 0.6328\mu$
$r_1 = -31.5784$    $d_0 = 51.8253$
$r_2 = -41.1848$    $d_1 = 2.6978$   $n_1 = 1.81236$
$r_3 = 157.2545$    $d_2 = 1.6902$
$r_4 = -64.4092$    $d_3 = 10.5417$  $n_2 = 1.81236$
Aberration factors when normalized to $f = 1$
$I = -99.722$ , $II = -9.6294$ , $III = -0.2382$
$P = 0.2393$ , $V = 0.5933$
$\phi_1 = -1.5731$ , $e' = 0.0612$ , $B_{01} = 7.1318$

EXAMPLE 13

$f = 300$ , FNO = 1:60 , $W/2 = 20.9°$,
Wavelength used $\lambda = 0.6328\mu$
$r_1 = -23.019$     $d_0 = 28.9$
$r_2 = -31.234$     $d_1 = 5.878$    $n_1 = 1.65$
$r_3 = -212.57$     $d_2 = 4.254$
$r_4 = -62.67$      $d_3 = 8.185$    $n_2 = 1.65$
Aberration factors when normalized to $f = 1$
$I = -295.1181$ , $II = -9.4625$ , $III = 0.3681$
$P = -0.0205$ , $V = 0.5562$
$\phi_1 = -1.6$ , $e' = 0.1$ , $B_{01} = 10.5434$

EXAMPLE 14

$f = 300$ , FNO = 1:60 , $W/2 = 20.77$ ,
Wavelength used $\lambda = 0.6328\mu$
$r_1 = -22.2285$    $d_0 = 29.4033$
$r_2 = -32.9487$    $d_1 = 8.0648$   $n_1 = 1.65$
$r_3 = -125.9297$   $d_2 = 4.1422$
$r_4 = -48.8046$    $d_3 = 4.6641$   $n_2 = 1.65$
Aberration factors when normalized to $f = 1$
$I = -283.0201$ , $II = -7.3334$ , $III = 0.273$
$P = -0.2468$ , $V = 0.4906$
$\phi_1 = -2.0081$ , $e' = 0.1$ , $B_{01} = 8.2543$

EXAMPLE 15

$f = 300$ , FNO = 1:60 , $W/2 = 21.04°$,
Wavelength used $\lambda = 0.6328\mu$
$r_1 = -59.1845$    $d_0 = 134.4845$
$r_2 = -68.8766$    $d_1 = 3.3766$   $n_1 = 1.65$
$r_3 = -429.3281$   $d_2 = 1.3993$
$r_4 = -109.7716$   $d_3 = 14.6846$  $n_2 = 1.65$
Aberration factors when normalized to $f = 1$
$I = 3.2452$ , $II = 0.0725$ , $III = -0.0772$
$P = 0.5204$ , $V = 0.6269$
$\phi_1 = -0.4$ , $e' = 0.1$ , $B_{01} = 17.8139$ For the design of lens of the type shown in Examples 1-10, values of $1/r_1$, $1/r_2$, $1/r_3$, $1/r_4$ and $d_2$ are in the range of;

$$-2.8679 \times \frac{1}{f} \leq \frac{1}{r_1} \leq 11.6239 \times \frac{1}{f}$$

$$-0.3498 \times \frac{1}{f} \leq \frac{1}{r_2} \leq 14.9534 \times \frac{1}{f}$$

$$0.1663 \times \frac{1}{f} \leq \frac{1}{r_3} \leq 6.8152 \times \frac{1}{f}$$

$$-4.0539 \times \frac{1}{f} \leq \frac{1}{r_4} \leq 2.5442 \times \frac{1}{f}$$

$$0.0019 \times f \leq d_2 \leq 0.4881 \times f$$

wherein f is focal length of the lens system.

Similarly, for the design of lens of the type shown in Examples 11-15, values of $1/r_1$, $1/r_2$, $1/r_3$, $1/r_4$ and $d_2$ are in the range of:

$$-20.5332 \times \frac{1}{f} \leq \frac{1}{r_1} \leq -5.0689 \times \frac{1}{f}$$

$$-13.7816 \times \frac{1}{f} \leq \frac{1}{r_2} \leq -4.3556 \times \frac{1}{f}$$

$$-5.5819 \times \frac{1}{f} \leq \frac{1}{r_3} \leq -0.6988 \times \frac{1}{f}$$

-continued $$-12.19 \times \frac{1}{f} \leqq \frac{1}{r_4} \leqq -2.7329 \times \frac{1}{f}$$

$$0.0004 \times f \leqq d_2 \leqq 0.0279 \times f$$

When the cylindrical lens system is composed of two cylindrical lenses and $$V = \frac{2}{3}\left\{ 1 - \frac{1}{2}\left(\frac{1}{2\phi_o}\right)^2 \right\} ,$$

a good effect on the uniformity of speed can be obtained by satisfying the following conditions:

The cylindrical lens system 5 is composed of a cylindrical lens 5a which is disposed on the side of the deflector and has a negative refractive power in the deflection surface and a cylindrical lens 5b which is disposed on the side of the scanned surface 7 and has a positive refractive power in the deflection surface.

The cylindrical lens system 5 satisfies the requirements given below provided that the focal length of the system 5 in the deflection surface is 1, $1.46 \leqq N_1 \leqq 1.84$ and $1.46 \leqq N_2 \leqq 1.84$:

$-5.5 \leqq \phi_1 \leqq -0.35$
$1.2 \leqq \phi_2 \leqq 5.7$
$-10 \leqq B_{01} \leqq 3$ or $1.35 \leqq \phi_1 \leqq 5.5$
$-5.3 \leqq \phi_2 \leqq -0.4$
$-13 \leqq B_{01} \leqq 4$ wherein, $\phi_1$: power of the first part system when the focal length of the lens system in the deflection surface is 1, $\phi_2$: power of the second part system when the focal length of the lens system in the deflection surface is 1, $B_{01}$: specific factor of the first part system.

Figure 8:
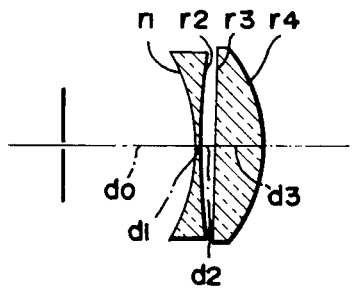

Examples of composition of the above described cylindrical lens system are given below. The lens configuration of Example 16 is shown in FIG. 8. Lenses shown in the following Examples 16–42 have the focal length of 300 and F number of 60. All the values of aberration factors are those obtained when normalized to f=1. $\phi_0$ is amplitude and $\omega/2$ is half angle of field.

EXAMPLE 16

$\phi_0 = 20°$ , $\omega/2 = 27.02°$,
$r_1 = -60.3868$, $d_0 = 44.7745$
$r_2 = 468.7497$, $d_1 = 2.9778$, $n_1 = 1.71159$
$r_3 = -4788.9738$, $d_2 = 3.8527$
$r_4 = -55.239$, $d_3 = 15.9289$, $n_2 = 1.77993$
I = 105.6268 , II = 9.0495 , III = -0.0459 , P = 0.0208 ,
V = 0.2183
$\phi_1 = -4.0002$ , $\phi_2 = 4.9134$ , $B_{01} = -0.433$

EXAMPLE 17

$\phi_0 = 23$ , $\omega/2 = 20.5°$
$r_1 = 296.8618$, $d_0 = 39.1781$
$r_2 = 173.2156$, $d_1 = 7.6284$, $n_1 = 1.56716$
$r_3 = 62.9508$, $d_2 = 12.0181$
$r_4 = 48.1409$, $d_3 = 6.6132$, $n_2 = 1.77975$
I = 120.4932 , II = 9.6542 , III = -0.0445 , P = 0.3812 ,
V = 0.0133

$\phi_1 = -0.4$ , $\phi_2 = 1.3667$ , $B_{01} = -6.8093$

EXAMPLE 18

$\phi_0 = 15°$ , $\omega/2 = 19.54°$
$r_1 = -80.5068$, $d_0 = 45.1773$
$r_2 = -598.2344$, $d_1 = 2.023$, $n_1 = 1.77764$
$r_3 = -65.978$, $d_2 = 3.6669$
$r_4 = -35.3681$, $d_3 = 3.8509$, $n_2 = 1.78239$
I = 318.4295 , II = 24.1083 , III = -0.4147 , P = 0.3166 ,
V = -0.4321
$\phi_1 = -2.5031$ , $\phi_2 = 3.2484$ , $B_{01} = 0.0398$

EXAMPLE 19

$\phi_0 = 15°$ , $\omega/2 = 19.92°$
$r_1 = -85.5401$, $d_0 = 44.9353$
$r_2 = 1321.8116$, $d_1 = 1.7126$, $n_1 = 1.6078$
$r_3 = -70.354$, $d_2 = 6.008$
$r_4 = -38.5754$, $d_3 = 5.7469$, $n_2 = 1.78203$
I = 277.2354 , II = 21.8472 , III = -0.4776 , P = 0.1299 ,
V = -0.4133
$\phi_1 = -2.27$ , $\phi_2 = 2.9643$ , $B_{01} = -0.14$

EXAMPLE 20

$\phi_0 = 20°$ , $\omega/2 = 26.82°$
$r_1 = -49.5354$, $d_0 = 42.7642$
$r_2 = -39.3573$, $d_1 = 3.5033$, $n_1 = 1.77999$
$r_3 = -44.8612$, $d_2 = 24.8992$
$r_4 = -51.8628$, $d_3 = 1.3833$, $n_2 = 1.51035$
I = 154.3932 , II = 6.7644 , III = -0.1592 , P = 0.3812 ,
V = 0.0926
$\phi_1 = 1.4058$ , $\phi_2 = -0.43$ , $B_{01} = -10.0248$

EXAMPLE 21

$\phi_0 = 20°$ , $\omega/2 = 26.88°$
$r_1 = -72.0653$, $d_0 = 42.4586$
$r_2 = -44.0406$, $d_1 = 6.1245$, $n_1 = 1.77891$
$r_3 = -50.5535$, $d_2 = 19.3514$
$r_4 = -95.2798$, $d_3 = 3.7201$, $n_2 = 1.51005$
I = 169.5434 , II = 6.2104 , III = -0.0776 , P = 0.219 ,
V = 0.114
$\phi_1 = 2.2607$ , $\phi_2 = -1.3809$ , $B_{01} = -5.4356$

EXAMPLE 22

$\phi_0 = 20°$ , $\omega/2 = 26.41°$
$r_1 = 319.5936$, $d_0 = 43.0598$
$r_2 = -56.8203$, $d_1 = 15.2132$, $n_1 = 1.65554$
$r_3 = -47.2863$, $d_2 = 12.9041$
$r_4 = 308.9742$, $d_3 = 7.9597$, $n_2 = 1.5111$
I = 84.1653 , II = -1.3442 , III = 0.0039 , P = -0.012 ,
V = -0.0079
$\phi_1 = 4.0101$ , $\phi_2 = -3.7668$ , $B_{01} = -2.1561$

EXAMPLE 23

$\phi_0 = 20°$ , $\omega/2 = 26.27°$
$r_1 = 2784.2869$, $d_0 = 42.1194$
$r_2 = -63.5345$, $d_1 = 15.6796$, $n_1 = 1.70932$
$r_3 = -56.2483$, $d_2 = 19.9774$
$r_4 = 383.5802$, $d_3 = 8.4216$, $n_2 = 1.51548$ -continued $I = 99.297$, $II = -0.0761$, $III = 0.1162$, $P = -0.076$,
$V = -0.0684$
$\phi_1 = 3.4178$, $\phi_2 = -3.1729$, $B_{01} = -2.3598$

EXAMPLE 24

$\phi_0 = 15°$, $\omega/2 = 25.26°$
$r_1 = -52.2902$, $d_0 = 41.4482$
$r_2 = -29.0321$, $d_1 = 7.8791$, $n_1 = 1.59108$
$r_3 = -29.9117$, $d_2 = 24.6423$
$r_4 = -60.3365$, $d_3 = 2.916$, $n_2 = 1.51002$
$I = 541.0695$, $II = 31.2753$, $III = -0.1101$, $P = -0.0007$,
$V = -0.397$
$\phi_1 = 3.0581$, $\phi_2 = -2.4955$, $B_{01} = -6.1309$

EXAMPLE 25

$\phi_0 = 15°$, $\omega/2 = 25.81°$
$r_1 = -115.8647$, $d_0 = 42.726$
$r_2 = -33.6996$, $d_1 = 10.1089$, $n_1 = 1.626$
$r_3 = -31.4955$, $d_2 = 14.9202$
$r_4 = -132.0856$, $d_3 = 2.972$, $n_2 = 1.52276$
$I = 382.3233$, $II = 18.9434$, $III = -0.0616$, $P = -0.0598$,
$V = -0.1969$
$\phi_1 = 4.1386$, $\phi_2 = -3.7531$, $B_{01} = -3.6556$

EXAMPLE 26

$\phi_0 = 15°$, $\omega/2 = 24.63°$
$r_1 = -245.25$, $d_0 = 20.$
$r_2 = -43.605$, $d_1 = 10.95$, $n_1 = 1.6077$
$r_3 = -80.045$, $d_2 = 26.15$
$r_4 = 140.85$, $d_3 = 6.64$, $n_2 = 1.6077$
$I = 348.3041$, $II = -0.1389$, $III = 0.198$, $P = -0.0834$,
$V = -0.6503$
$\phi_1 = 3.5017$, $\phi_2 = -3.6059$, $B_{01} = -3.5017$

EXAMPLE 27

$\phi_0 = 10°$, $\omega/2 = 14.12°$
$r_1 = -35.6653$, $d_0 = 43.8408$
$r_2 = -21.7994$, $d_1 = 5.2267$, $n_1 = 1.50763$
$r_3 = -22.341$, $d_2 = 31.034$
$r_4 = -31.5748$, $d_3 = 2.8744$, $n_2 = 1.78016$
$I = 1028.8103$, $II = 74.583$, $III = 0.0768$, $P = 0.0805$,
$V = -1.5861$
$\phi_1 = 3.0607$, $\phi_2 = -2.6457$, $B_{01} = -8.1212$

EXAMPLE 28

$\phi_0 = 10°$, $\omega/2 = 14.13°$
$r_1 = -42.4288$, $d_0 = 44.8537$
$r_2 = -21.5206$, $d_1 = 5.264$, $n_1 = 1.51299$
$r_3 \, 32 \, -20.0884$, $d_2 = 22.7283$
$r_4 = -40.1905$, $d_3 = 2.7712$, $n_2 = 1.51056$
$I = 1085.6728$, $II = 75.1292$, $III = -0.1103$, $P = -0.1955$,
$V = 1.579$
$\phi_1 = 3.8235$, $\phi_2 = -3.6347$, $B_{01} = -6.282$

EXAMPLE 29

$\phi_0 = 20°$, $\omega/2 = 26.31°$
$r_1 = 198.8838$, $d_0 = 38.8588$
$r_2 = 1092.9751$, $d_1 = 4.4237$, $n_1 = 1.77992$ -continued $r_3 = 62.6797$, $d_2 = 2.8915$
$r_4 = 54.9593$, $d_3 = 2.9212$, $n_2 = 1.7659$
$I = -4.0754$, $II = -3.6418$, $III = -0.0207$, $P = 0.4896$,
$V = 0.1438$
$\phi_1 = 1.3882$, $\phi_2 = -0.4302$, $B_{01} = -0.5878$

EXAMPLE 30

$\phi_0 = 20°$, $\omega/2 = 25.78°$
$r_1 = 171.3399$, $d_0 = 43.8845$
$r_2 = 290.1454$, $d_1 = 6.3061$, $n_1 = 1.78002$
$r_3 = 275.0705$, $d_2 = 9.6543$
$r_4 = 79.5611$, $d_3 = 8.0766$, $n_2 = 1.5104$
$I = 16.5008$, $II = 1.4619$, $III = 0.0488$, $P = 0.3147$,
$V = 0.0856$
$\phi_1 = 2.1593$, $\phi_2 = -1.3488$, $B_{01} = -1.0232$

EXAMPLE 31

$\phi_0 = 15°$, $\omega/2 = 24.23°$
$r_1 = 98.7412$, $d_0 = 38.7525$
$r_2 = 1162.5637$, $d_1 = 5.4247$, $n_1 = 1.78001$
$r_3 = 184.789$, $d_2 = 16.1757$
$r_4 = 55.3385$, $d_3 = 2.9061$, $n_2 = 1.51069$
$I = 15.5054$, $II = -1.2606$, $III = -0.0424$, $P = 0.1607$,
$V = -0.4904$
$\phi_1 = 2.5668$, $\phi_2 = -1.9251$, $B_{01} = -0.4365$

EXAMPLE 32

$\phi = 15°$, $\omega/2 = 24.7°$
$r_1 = 80.0701$, $d_0 = 38.8722$
$r_2 = 2365.5316$, $d_1 = 6.0947$, $n_1 = 1.77591$
$r_3 = 166.3436$, $d_2 = 9.1968$
$r_4 = 51.5021$, $d_3 = 2.9444$, $n_2 = 1.59303$
$I = 22.6696$, $II = -0.5299$, $III = 0.0213$, $P = 0.1953$,
$V = -0.3566$
$\phi_1 = 3.0023$, $\phi_2 = -2.3622$, $B_{01} = -0.3402$

EXAMPLE 33

$\phi_0 = 10°$, $\omega/2 = 13.98°$
$r_1 = 41.1079$, $d_0 = 51.4077$
$r_2 = 677.6539$, $d_1 = 6.2992$, $n_1 = 1.50992$
$r_3 = 63.4573$, $d_2 = 14.2564$
$r_4 = 31.9654$, $d_3 = 2.7902$, $n_2 = 1.75365$
$I = 75.4906$, $II = 102.33$, $III = 0.0963$, $P = 0.3135$,
$V = -1.6758$
$\phi_1 = 3.5079$, $\phi_2 = 3.3771$, $B_{01} = 0.5093$

EXAMPLE 34

$\phi_0 = 10°$, $\omega/2 = 13.92°$
$r_1 = 36.6945$, $d_0 = 51.4783$
$r_2 = 549.8864$, $d_1 = 11.5492$, $n_1 = 1.51571$
$r_3 = 58.7575$, $d_2 = 6.2811$
$r_4 = 28.2295$, $d_3 = 4.6865$, $n_2 = 1.78001$
$I = 100.0156$, $II = 13.0392$, $III = 0.0189$, $P = 0.1765$,
$V = -1.843$
$\phi_1 = 3.9648$, $\phi_2 = 4.0168$, $B_{01} = 0.5094$

EXAMPLE 35

$\phi_0 = 10°$, $\omega/2 = 13.85°$

-continued $r_1 = 37.2432$, $d_0 = 35.7165$
$r_2 = 374.3453$, $d_1 = 4.7222$, $n_1 = 1.53625$
$r_3 = 66.7667$, $d_2 = 13.8068$
$r_4 = 29.2251$ $d_3 = 6.5243$, $n_2 = 1.79747$
$I = 110.0997$, $II = 13.0624$, $III = 0.1157$, $P = -0.0288$,
$V = -2.0409$
$\phi_1 = 3.9082$. $\phi_2 = -4.2473$, $B_{01} = 0.554$

EXAMPLE 36

$\phi_0 = 20°$, $\omega/2 = 26.62°$
$r_1 = -64.145$, $d_0 = 38.0464$
$r_2 = -47.7024$, $d_1 = 4.822$, $n_1 = 1.7702$
$r_3 = -900.3147$, $d_2 = 20.8087$
$r_4 = 589.4055$, $d_3 = 3.0003$, $n_2 = 1.51037$
$I = 136.7139$, $II = 5.0768$, $III = -0.1772$, $P = 0.4168$,
$V = 0.0415$
$\phi_1 = 1.4$, $\phi_2 = 0.4301$, $B_{01} = -8.193$

EXAMPLE 37

$\phi_0 = 20°$, $\omega/2 = 26.37°$
$r_1 = 365.4645$, $d_0 = 38.8355$
$r_2 = 84.5915$, $d_1 = 9.3452$, $n_1 = 1.77993$
$r_3 = -240.7925$, $d_2 = 20.1568$
$r_4 = 214.5115$, $d_3 = 4.5897$, $n_2 = 1.51001$
$I = 65.3646$, $II = 0.03943$, $III = 0.03021$, $P = 0.3011$,
$V = -0.0183$
$\phi_1 = 2.1567$, $\phi_2 = -1.3533$, $B_{01} = -2.8853$

EXAMPLE 38

$\phi_0 = 15°$, $\omega/2 = 25.19°$
$r_1 = 53.5753$, $d_0 = 40161$
$r_2 = -40.0577$, $d_1 = 5.9256$, $n_1 = 1.77995$
$r_3 = 262.0222$, $d_2 = 2.0349$
$r_4 = 105.0852$, $d_3 = 7.3101$, $n_2 = 1.51027$
$I = 259.8556$, $II = 16.0775$, $III = -0.0812$, $P = 0.2503$,
$V = -0.3657$
$\phi_1 = 1.7767$, $\phi_2 = -0.8587$, $B_{01} = 8.2162$

EXAMPLE 39

$\phi_0 = 15°$, $\omega/2 = 25.04°$
$r_1 = 516.6602$, $d_0 = 46.569$
$r_2 = -68.4463$, $d_1 = 6.9867$, $n_1 = 1.78012$
$r_3 = -212.2551$, $d_2 = 14.855$
$r_4 = 94.6513$, $d_3 = 2.9906$, $n_2 = 1.51162$
$I = 142.5261$, $II = 7.352$, $III = -0.07561$, $P = 0.1152$,
$V = -0.4$
$\phi_1 = 2.9866$, $\phi_2 = -2.3525$, $B_{01} = -2.5876$

EXAMPLE 40

$\phi_0 = 15°$, $\omega/2 = 24.52°$
$r_1 = 1481.9153$, $d_0 = 38.0105$
$r_2 = 77.8135$, $d_1 = 6.2935$, $n_1 = 1.78894$
$r_3 = 117.4756$, $d_2 = 30.3176$
$r_4 = 115.3665$, $d_3 = 8.1318$, $n_2 = 1.52864$
$I = 101.8037$, $II = -0.4863$, $III = 0.3017$, $P = -0.1714$,
$V = -0.5913$
$\phi_1 = 2.8876$, $\phi_2 = -2.7575$, $B_{01} = -2.377$

EXAMPLE 41

$\phi_0 = 10°$, $\omega/2 = 14.07°$
$r_1 = -59.8531$, $d_0 = 45.8073$
$r_2 = 36.0662$, $d_1 = 4.2633$, $n_1 = 1.77986$
$r_3 = 107.9603$, $d_2 = 22.1727$
$r_4 = 527.3925$, $d_3 = 2.4633$, $n_1 = 1.77997$
$I = 497.9507$, $II = 39.3663$, $III = -0.0223$, $P = 0.1735$,
$V = 1.6676$
$\phi_1 = 2.78$, $\phi_2 = -2.246$, $B_{01} = -5.3189$

EXAMPLE 42

Figure 5:
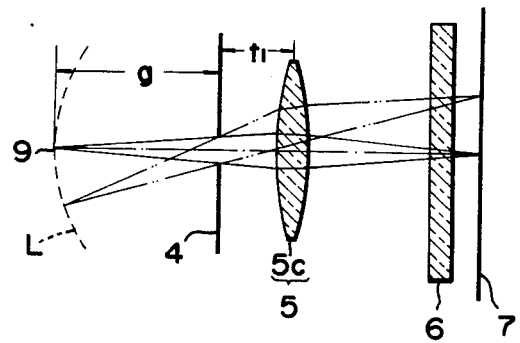
FIG. 5 is a similar view to FIG. 4 but showing another arrangement in which only a single cylindrical lens is used to attain the aimed uniformity of speed.

$\phi_0 = 10°$, $\omega/2 = 13.98°$
$r_1 = 817.8804$, $d_0 = 48.0267$
$r_2 = -47.5003$, $d_1 = 5.1456$, $n_1 = 1.67065$
$r_3 = 281.3072$, $d_2 = 17.3088$
$r_4 = 47.9605$, $d_3 = 2.9255$, $n_2 = 1.78024$
$I = 412.8724$, $II = 32.6302$, $III = -0.012$, $P = 0.114$,
$V = -1.859$
$\phi_1 = 3.9995$, $\phi_2 = -4.0253$, $B_{10} = -2.6381$ Secondly, description will be made of a cylindrical lens system 5 comprising only one cylindrical lens as shown in FIG. 5. When there is used such a cylindrical lens system 5 which is composed of only one single cylindrical lens 5c as shown in FIG. 5, it is required to satisfy the relation:

$$g = -Nf \qquad (3)$$

wherein, g is distance from the deflecting mirror surface 4 to the light source or image thereof 9, f is focal length of the cylindrical lens 5c, and N is refractive index of the scanning lens.

As long as the above relation is satisfied, the object point on the arcuate locus L which the moving image of light source describes as the deflecting mirror surface 4 rotates, is always imaged on the scanned surface 7 after passing through the cylindrical lens 5c.

In the case where one single scanning lens is used with its F number being on the dark side, there is practically no need for considering correction of spherical aberration and coma. Only astigmatism and distortion must be taken into consideration.

According to the teaching disclosed in the above mentioned literature "Methods for Lens Design" by Matui, the following relation holds good for thin lenses:

$$\begin{cases} III = a_{III}A_o + b_{III}B_o + C_{III} \\ V = a_v A_o + b_v B_o + C_v \end{cases} \qquad (4)$$

In the above relation formula, $a_{III}$, $b_{III}$, $C_{III}$, $a_v$, $b_v$ and $C_v$ are constants called characterization factors which are determined by paraxial relation and medium in the area before and after the thin lens system. $A_o$ and $B_o$ are specific factors serving as parameter to determine the shape and profile of the lens. In the case of a single lens, there exists a dependent relation between $A_o$ and $B_o$ so that when one is determined, the other is automatically given. Therefore, by giving an aimed value, that is, III (astigmatism)=0 to the above formula (4), value of $A_o$ or $B_o$ is obtained and thereby the configuration (shape and profile) of the lens is determined. At the same time, the value of distortion is dependently determined according to the formula (4). Let $V_o$ denote this value and $\phi_0$ denote the amplitude of rotational motion of the deflecting mirror. The uniformity of scanning speed on the scanned surface can be attained by using such deflecting mirror which has a rotational amplitude $\phi_0$ satisfying the relation $$\phi_o \frac{1}{2\sqrt{2 - 3\left(\frac{g}{g+t_1}\right)^2 V_o}} \quad (5)$$

and has such characteristics of rotational motion as represented by $$\phi = \phi_0 \sin kt \quad (6)$$

wherein,
g is distance from deflecting mirror surface 4 to image of light source 9,
$t_1$ is distance from the lens to the deflecting mirror,
$\phi$ is angle of rotation of the deflecting mirror,
k is a constant, and
t is time, provided that when t=0, the deflected beam coincides with the optical axis of cylindrical lens 5c.

One example of the cylinder lens designed according to the above described theory is gives below as Example 43.

In Example 43, $R_1$ is radius of curvature of the first surface of the cylindrical lens 5c, $R_2$ is radius of curvature of the second surface of the same, d is lens thickness, N is refractive index, IV is field curvature, $IV_o$ is theoretical aberration factor of sagittal field curvature and $V_o$ is that of distortion.

EXAMPLE 43

| | | | |
|---|---|---|---|
| $\phi_0$ | 27.50 | I | 15.86082 |
| $g + t_1$ | −300 | II | −1.94748 |
| $t_1$ | −22.5 | III | 0.17670 |
| $R_1$ | −73.89551 | P | 0.51300 |
| $R_2$ | −47.10851 | IV | 0.68970 |
| d | 5 | V | 0.35726 |
| N | 1.8 | $IV_0$ | 0.54054 |
| | | $V_0$ | 0.35638 |

All the examples described above concern the case where no aspherical element is introduced in the deflection surface. Now, description will be made of the case where an aspherical element is introduced.

For this case, in contrast with the above formula (4), the following relation formula (7) is given according to the above mentioned literature "Methods for Lens Design" by Matui:

$$\begin{cases} III = a_{IV}A_o + b_{IV}B_o + C_{IV} + a_{IV}\Psi e \\ V = a_V A_o + b_V B_o + C_V + a_V \Psi e \end{cases} \quad (7)$$

If aimed values are set for III and V in the formula (7), then the formula (7) will give simultaneous equations in which any one of $A_o$ and $B_o$ and the aspherical factor $\psi e$ are unknown. By solving the simultaneous equations, the shape and profile (including the aspherical surface) of the lens can be determined.

Figure 6:
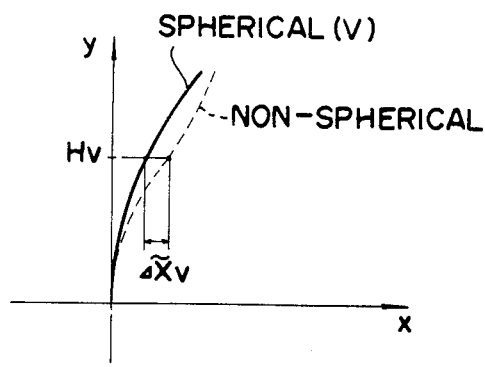
FIG. 6 is an explanatory view of an aspherical surface used in the optical scanning system according to the invention.

In the above, $\psi e$ is the sum of the aspherical factor of one side surface of a single lens and the aspherical factor of another side surface of the same and it is given by $$\Psi e = \sum_{\nu=1}^{2} (N_\nu' - N_\nu) b_\nu \quad (8)$$

wherein, $N_\nu$ is refractive index of the medium in front of the surface, $N_\nu'$ is refractive index of the medium behind the surface and $b_\nu$ is a value related with deviation $\Delta\tilde{x}_\nu$ described hereunder. $\Delta\tilde{x}_\nu$ is defined as the deviation of the aspherical surface from the corresponding aspherical surface as will be understood from FIG. 6. The relation between $\Delta\tilde{x}_\nu$ and $b_\nu$ is represented by $$\Delta\tilde{x}_\nu = (b\nu/g) H_\nu^4 \quad (9)$$

The number of aspherical surfaces introduced may be one or more. Independent quantity is $\psi e$ given by the formula (8).

One example of the cylindrical lens system designed according to the above described theory is given below as Example 44, wherein $b_2$ is the aspherical factor of the second surface and $\phi_0 = \infty$ means deflection at uniform angular velocity.

EXAMPLE 44

| | | | |
|---|---|---|---|
| $\phi_0$ | ∞ | I | −9.35168 |
| $g + t_1$ | −300 | II | −3.02105 |
| $t_1$ | −45 | III | 0 |
| $R_1$ | 145.95480 | P | 0.55866 |
| $R_2$ | −654.26213 | IV | 0.55866 |
| $b_2$ | $4.3106 \times 10^{-6}$ | V | 0.92272 |
| d | 10. | IV | 0.58824 |
| N | 1.8 | $V_0$ | 0.92272 |

While in the above described example there is shown only the case $\phi_0 = \infty$, it is also possible to design a cylindrical lens system applicable for the case where the value of $\phi_0$ is definite, namely the case of sinusoidal oscillation deflection according to the above described theory.

In this case, the configuration of the cylindrical lens can be determined by solving the simultaneous equations of formula (7) after setting for its aimed value such distortion factor $V_o$ which satisfies the relation:

$$V_o = \frac{2}{3}\left(\frac{g+t_1}{g}\right)^2 \left\{ 1 - \frac{1}{2}\left(\frac{1}{2\phi_o}\right)^2 \right\}$$

Figure 9:
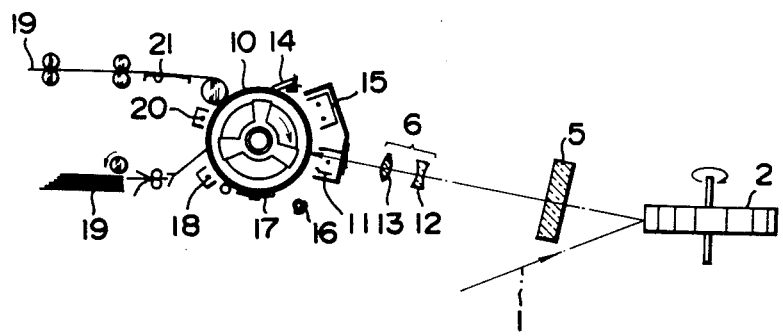
FIG. 9 shows an application of the invention wherein the optical scanning system according to the invention is applied to a laser beam printer.

FIG. 9 shows the optical arrangement of a laser beam printer to which the optical scanning system according to the invention is applied.

A beam of light emitted from a laser light source is modulated by a modulating apparatus and the modulated parallel beam 1 is deflected by a rotating polygon mirror 2. The deflected beam is imaged on a drum 10 through a cylindrical lens system 5,6 as already described with reference to FIG. 1. In this type of printing apparatus, the cylindrical lens 6 must image the deflected beam on the drum 10 through the second corona discharger 11. As the cylindrical lens 6, it is desirable to use a lens which has a long back focal length. To meet this requirement, in the optical scanning system shown in FIG. 9, the cylindrical lens 6 is composed of two cylindrical lenses 12 and 13 arranged in a fashion of retro focus lens. By this arrangement, there is obtained a cylindrical lens which is short in focal length and long in back focal length, with its principal plane being in the second corona discharger 11. In the drawing of FIG. 9, the reference numeral 14 designates a cleaning blade for removing residual toner, 15 is a first corona discharger, 16 is a lamp, 17 is a developing device, 18 is a charging device, 19 is a transfer material, 20 is a charging device for transferring, 21 is a fixing device and 22 is a sheet of printed paper.

Figure 10:
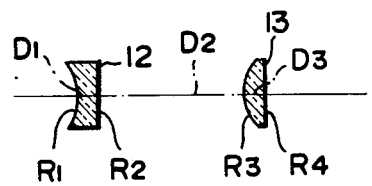
FIG. 10 shows an example of an arrangement of the cylindrical lens system used in the apparatus shown in FIG. 9.

Lens data of the cylindrical lens system 6 used in the system shown in FIG. 9 are given below. As to symbols $R_1 - R_4$ indicating the surfaces of the lenses 12 and 13 and $D_1 - D_3$ indicating the distances between the surfaces, refer to FIG. 10.

| | |
|---|---|
| $R_1 = -28.63967$ | $R_2 = \infty$ |
| $R_3 = 18.58279$ | $R_4 = \infty$ |
| $D_1 = 10$ | $D_2 = 73.39768$ |
| $D_3 = 10$ | $N_1 = 1.51462$ |
| $N_2 = 1.51462$ | |

What we claim is:

1. An optical scanning system comprising:
   a light source;
   a light deflecting device for receiving a beam of light coming from said light source and deflecting the received beam in a predetermined direction;
   a surface scanned by the beam of light deflected by said deflecting device; and
   an anamorphic optical system disposed between said deflecting device and said scanned surface, said anamorphic optical system comprising a first anamorphic optical system which has an imaging action only in the direction of the scanning line and is composed of a first cylindrical lens of negative power and a second cylindrical lens of positive power, the first lens being positioned nearer to said deflecting device, and a second anamorphic optical system which has an imaging action only in the direction normal to the scanning line direction, said first anamorphic optical system being provided with means for moving the beam spot on the scanned surface at a uniform speed and wherein the deflection surface of said deflecting device and said scanned surface are disposed optically conjugative with each other relative to said second anamorphic optical system.

2. An optical scanning system comprising:
   a light source;
   a light deflecting device for deflecting a beam of light coming from said source in a predetermined direction;
   a surface scanned by the beam of light deflected by said deflecting device; and
   an anamorphic optical system disposed between said deflecting device and said scanned surface, said anamorphic optical system comprising a first anamorphic optical system which has a focussing action only in the direction of the scanning line and is composed of a first cylindrical lens of negative power and a second cylindrical lens of positive power, the first lens being nearer to said deflecting device and a second anamorphic optical system which has a focussing action only in the direction normal to the scanning line direction, said first anamorphic optical system being provided with means for moving the beam spot on said scanned surface at a uniform speed and the focal line of said second anamorphic optical system being on said scanned surface.

3. A scanning device with an anamorphic optical system comprising:
   a light source;
   a light deflecting device having sinusoidal deflection and a maximum amplitude $\phi_0$ for receiving a beam of light coming from said light source and deflecting the received beam in a predetermined direction;
   a surface scanned by the beam of light deflected by said deflecting device;
   an anamorphic optical system disposed between said deflecting device and said scanned surface, said anamorphic optical system comprising a first anamorphic optical system which has an imaging action only in the direction of the scanning line and a second anamorphic optical system which has an imaging action only in the direction normal to the scanning line direction; and
   said first anamorphic optical system is a cylindrical lens having a spherical surface, and the moving velocity of the light rays on the surface is constant by selecting said amplitude $\phi_0$ of said deflecting device, in which said amplitude $\phi_0$ of the deflecting device is determined by $$\phi_0 = \frac{1}{2\sqrt{2 - 3\left(\frac{g}{g+t_1}\right)^2} V}$$

where $t_1$ is a distance between said first anamorphic optical system and the deflecting device measured from the first anamorphic optical system toward the deflecting device; g is the distance between the deflecting device and the light source measured from the deflecting device toward the light source and V is the distortion coefficient of the first anamorphic optical system.

* * * * *

UNITED STATES PATENT AND TRADEMARK OFFICE
CERTIFICATE OF CORRECTION

PATENT NO. : 4,318,583

Page 1 of 2

DATED : March 9, 1982

INVENTOR(S) : TAKESHI GOSHIMA, ET AL.

It is certified that error appears in the above-identified patent and that said Letters Patent are hereby corrected as shown below:

Column 8, line 65, "$d_{26}$" should read --$d_3$--.

Column 10, line 54, "0.4881" should read --0.1881--.

Column 13, line 34, "1,6077" should read --1.6077--;
line 68, "1092/9751" should read -- -1092.9751--.

Column 14, line 14, "275.0705" should read -- -275.0705--;
line 24, "1162.5637" should read -- -1162.5637--.

Column 15, line 25, "365.4645" should read -- -365.4645--;
line 38, "53.5753" should read -- -53.5753--;
line 44, "8.2162" should read -- -8.2162--;
line 49, "516.6602" should read -- -516.6602--.

UNITED STATES PATENT AND TRADEMARK OFFICE
CERTIFICATE OF CORRECTION

PATENT NO. : 4,318,583    Page 2 of 2

DATED : March 9, 1982

INVENTOR(S) : TAKESHI GOSHIMA, ET AL.

It is certified that error appears in the above-identified patent and that said Letters Patent are hereby corrected as shown below:

Column 16, line 6, "36.0662" should read -- -36.0662--;
          line 9, "1.6676" should read -- -1.6676--.

Signed and Sealed this

*Seventeenth* Day of *August 1982*

[SEAL]

Attest:

Attesting Officer

GERALD J. MOSSINGHOFF

*Commissioner of Patents and Trademarks*